United States Patent
Cohen et al.

(10) Patent No.: US 10,623,375 B2
(45) Date of Patent: Apr. 14, 2020

(54) AUTO-DETECTION OF WEB-BASED APPLICATION CHARACTERISTICS FOR REVERSE PROXY ENABLEMENT

(71) Applicant: International Business Machines Corporation, Armonk, NY (US)

(72) Inventors: Richard Jay Cohen, Austin, TX (US); Anne Louise Bolgert, Austin, TX (US); Randolph Michael Forlenza, Austin, TX (US); Miguel Sang, Austin, TX (US); Krishna Kishore Yellepeddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 14/487,414

(22) Filed: Sep. 16, 2014

(65) Prior Publication Data
US 2016/0080324 A1 Mar. 17, 2016

(51) Int. Cl.
*H04L 29/06* (2006.01)
*H04L 29/08* (2006.01)

(52) U.S. Cl.
CPC ...... *H04L 63/0281* (2013.01); *H04L 63/1425* (2013.01); *H04L 63/168* (2013.01); *H04L 63/20* (2013.01); *H04L 67/02* (2013.01); *H04L 67/22* (2013.01)

(58) Field of Classification Search
CPC ..... H04L 63/02; H04L 63/0281; H04L 63/04; H04L 63/0428
See application file for complete search history.

(56) References Cited

U.S. PATENT DOCUMENTS 7,076,797 B2   7/2006  Loveland
7,788,235 B1 *  8/2010  Yeo ...................... G06F 21/606
                                             707/687

(Continued)

FOREIGN PATENT DOCUMENTS

JP           4363752 B2    11/2009

*Primary Examiner* — Lynn D Feild
*Assistant Examiner* — Richard A McCoy
(74) *Attorney, Agent, or Firm* — Jeffrey S. LaBaw; David H. Judson

(57) ABSTRACT

This disclosure describes an automated process of discovering characteristics needed to integrate a web-based application to a web portal, such as a reverse proxy. This process eliminates the need for application owners and security analysts to manually discover the information needed for the on-boarding process. To this end, application-specific information is determined by monitoring network traffic flows in and out of the application, user authentication and authorization event data, and the like. An application discovery engine analyzes the discovered data, preferably against a set of patterns and heuristic-based rules, to discover or identify the one or more application characteristics. A set of configuration data is then generated, and this configuration data is then used to integrate the application into the web reverse proxy and, in particular, by specifying the configuration needed to "board" the application. Preferably, the monitoring and application characterization determination functions occur in an automated manner.

20 Claims, 4 Drawing Sheets

(56) References Cited

U.S. PATENT DOCUMENTS

| | | | |
|---|---|---|---|
| 7,966,369 B1* | 6/2011 | Briere | G06Q 10/10 |
| | | | 707/616 |
| 8,666,807 B1* | 3/2014 | Murray | G06Q 30/0241 |
| | | | 705/14.4 |
| 8,694,781 B1* | 4/2014 | Griffin | G06F 9/45558 |
| | | | 713/168 |
| 9,244,976 B1* | 1/2016 | Zhang | G06F 17/30442 |
| 2006/0230062 A1* | 10/2006 | Roy-Chowdhury | H04L 67/02 |
| 2008/0077982 A1 | 3/2008 | Hayler et al. | |
| 2011/0251906 A1* | 10/2011 | Loevenguth | G06Q 20/10 |
| | | | 705/16 |
| 2014/0068445 A1 | 3/2014 | Kempf et al. | |
| 2014/0074591 A1* | 3/2014 | Allen | G06Q 30/0244 |
| | | | 705/14.43 |

* cited by examiner

AUTO-DETECTION OF WEB-BASED APPLICATION CHARACTERISTICS FOR REVERSE PROXY ENABLEMENT

BACKGROUND

Technical Field

This disclosure relates generally to web application security and in particular to on-boarding applications used in association with a Web portal.

Background of the Related Art

It is known in the prior to provide so-called Web portals, which are web-based reverse proxy mechanisms that centralize access to information, applications, and services for employees, customers, or partners. A Web portal delivers a consolidated view that lets users access electronic resources of the organization using a standard technology (e.g., a web browser), simply and efficiently. Within a Web portal or like environment, typically a proxy or web server acts as a front-end "point of contact" to a set of back-end applications or application components. In this type of environment, it is desirable that the mechanism used to provide authentication and session management at the web portal layer should also provide these functions for any back-end applications that are included in a consolidated view.

Companies want to make web-based business applications available to internal and external users. Indeed, a company may have thousands of applications, using a wide variety of technologies, which may have been developed in-house or may be third party applications. Further, the number and variety of applications that a company supports may well grow over time. Each of these applications must be secured, such that only authorized users are permitted access. To secure the applications, user authentication is required along with coarse-grained or fine-grained authorization over the function provided by the applications. As described above, to centralize the authentication and authorization, many companies use Web portals (i.e., web reverse proxy products) as gateways to their applications. As described above, when the web reverse proxy is used, it sits in front of the application and handles the authentication and authorization functions, and it passes the information to the application.

Because each application may be implemented using different technologies, it may require a significant amount of effort to integrate (also referred to as "boarding" or "on-boarding") an application with the web reverse proxy. Indeed, the problem of boarding an application to a Web portal can be quite challenging. Current techniques to integrate the applications require both security professionals and business application owners to manually gather and discover the characteristics of each of the applications so that Web proxy experts can successfully integrate the application. This requirement can prove to be difficult, at least in part because security professionals and application owners have different levels of knowledge and use different vocabularies. It can also take a large amount of time to determine the proper information for each application, thus making the time to board thousands of applications prohibitive.

BRIEF SUMMARY

According to this disclosure, the process of discovering the characteristics needed to integrate a web-based application behind a web portal (a web-based reverse proxy) is automated. This process eliminates the need for application owners and security analysts to manually discover the information needed for the boarding process.

In one embodiment, application-specific information to facilitate application on-boarding is determined using various methods, e.g., examining network traffic to and from an application, and performing deep packet analysis on that data. This information obtained is then analyzed to look for information that can reveal a required set of one or more characteristics. To begin the process of discovering an application's characteristics, preferably a set of parameters are specified to narrow the scope of network traffic associated with the application to be monitored. The application is monitored for a period of time, preferably using various network monitoring and application scanning tools, until sufficient data required to characterize the application is obtained. An application discovery engine analyzes the discovered data, preferably against a set of patterns and heuristic-based rules stored in a database, to discover (or identify) the one or more application characteristics. Preferably, as the data is being gathered, a GUI-based progress indicator shows when sufficient information is obtained to enable the application's characteristics to be determined. The GUI preferably also shows which data is still being gathered and which characteristics may not have any data discovered yet. Once one or more application characteristics (or as many as possible) have been discovered, a set of configuration data (or a report detailing the discovered values) for the web portal is output. The configuration data (or the report) is then used to integrate the application into the web reverse proxy and, in particular, by specifying the configuration needed to "board" the application. Preferably, the monitoring and application characteristics determination functions occur in an automated manner.

The foregoing has outlined some of the more pertinent features of the disclosed subject matter. These features should be construed to be merely illustrative. Many other beneficial results are attained by applying the disclosed subject matter in a different manner or by modifying the subject matter as will be described.

BRIEF DESCRIPTION OF THE DRAWINGS

For a more complete understanding of the subject disclosure and the advantages thereof, reference is now made to the following descriptions taken in conjunction with the accompanying drawings, in which.

DETAILED DESCRIPTION OF AN ILLUSTRATIVE EMBODIMENT

Figure 1:
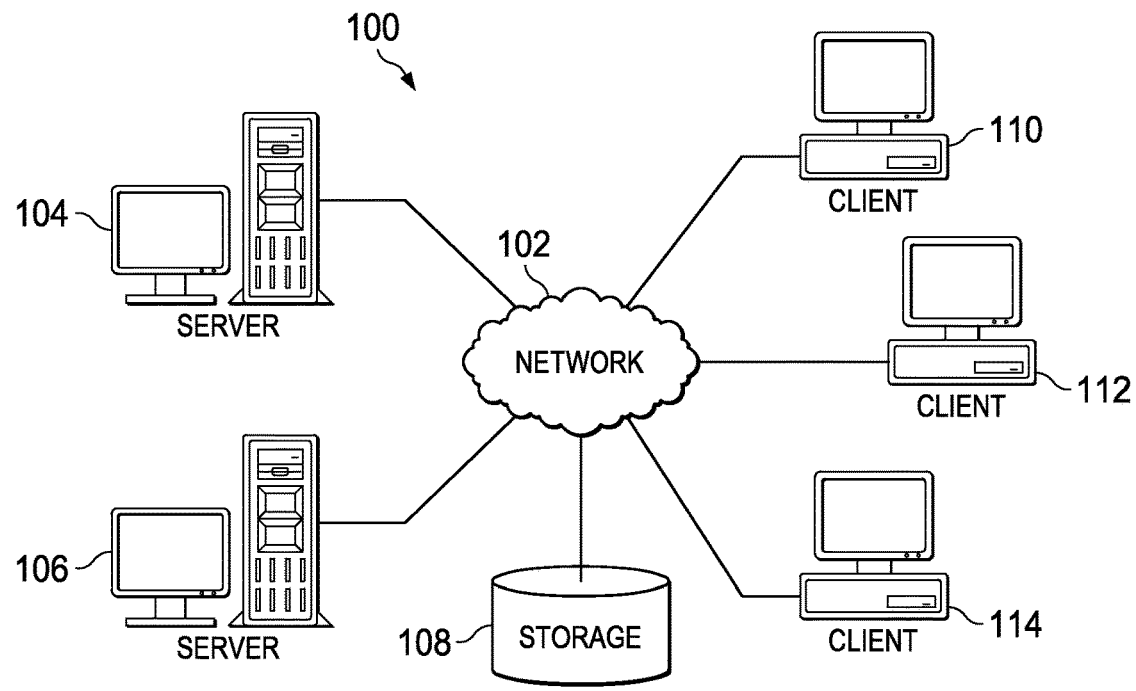
FIG. 1 depicts an exemplary block diagram of a distributed data processing environment in which exemplary aspects of the illustrative embodiments may be implemented.
Figure 2:
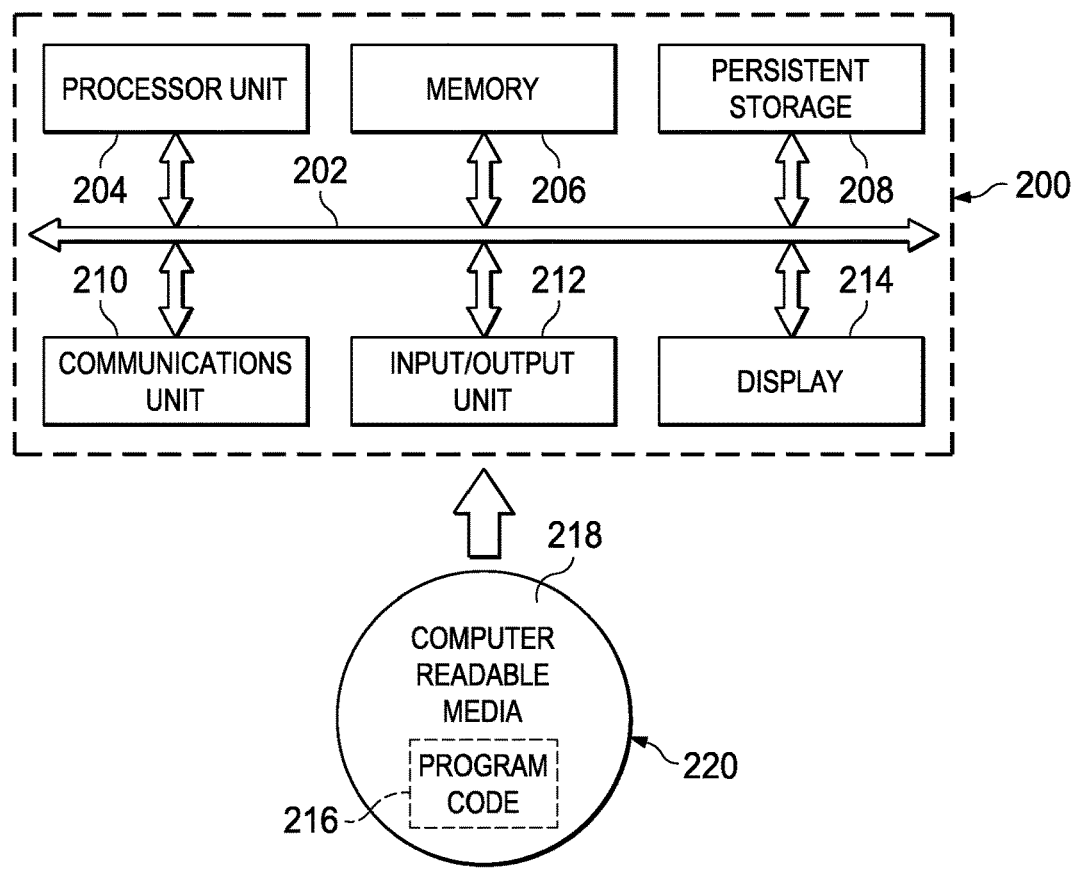
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Computing Environments With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C or the like, and conventional procedural programming languages, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Web Proxy/Portal Environments

As will also be described, the technique that is the subject of this disclosure also may be implemented in a system that includes a session management component, sometimes referred to as "Web portal."

Figure 3:
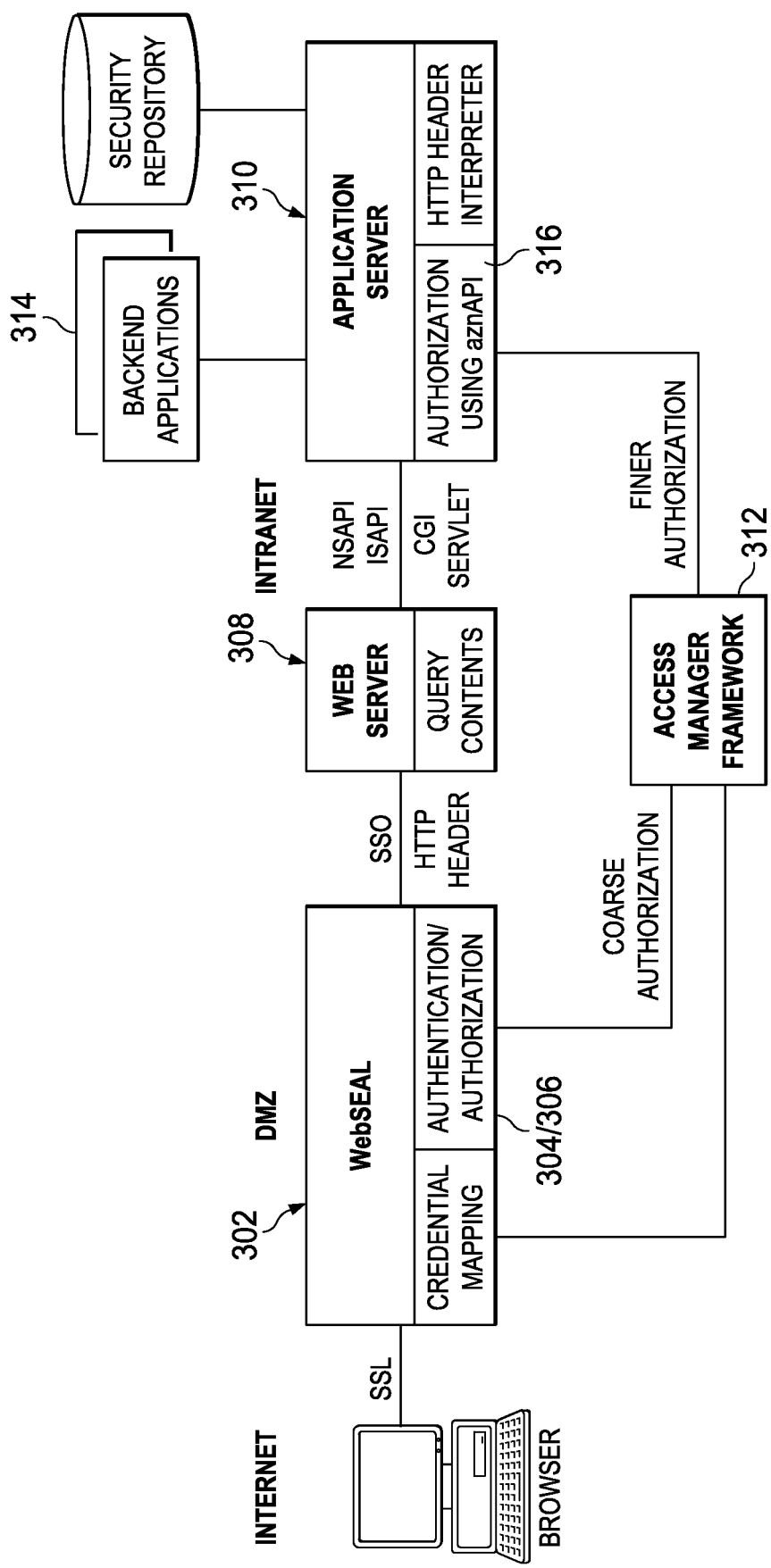
FIG. 3 illustrates a known Web portal having an access management framework in which the subject disclosure may be implemented.

By way of background, session management typically is provided in association with an access manager, which is a component that prevents unauthorized use of resources, including the prevention of use of a given resource in an unauthorized manner. A representative access manager is IBM Security Access Manager (ISAM) (formerly the Tivoli® Access Manager for e-business) product, which is available commercially from IBM, and is represented in FIG. 3. Of course, the identification of this commercial product is not meant to be taken to limit the present invention. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. As described above, this component is responsible for the session management of users.

FIG. 3 illustrates how ISAM is integrated in a Web portal to provide authorization and access control services for Web resources. A high performance, multi-threaded Web server 302 (called WebSEAL in the figure), an ISAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

As one of ordinary skill in the art will appreciate, ISAM provides a reverse proxy, web plug-in or the like that provides session management functionality and that includes authorization functionality as part of this session management. Authentication is handled by ISAM, meaning that ISAM collects a user's authentication credentials, evaluates them, and establishes a session, including some form of session management functionality (such as a session cookie). To provide a user with the advantages of this consolidated environment, ISAM then provides a single sign-on solution for the user by asserting authentication credentials (such as username/password) to the back-end applications. This allows the back-end application to be added to the portal environment without modification.

With the above as background, the techniques of this disclosure are now described.

Auto-Detection of Web-Based Application Characteristics for Reverse Proxy Enablement According to this disclosure, web-based application characteristics are automatically detected and characterized to facilitate on-boarding of the application in association with a reverse proxy. This process is sometimes referred to herein as "reverse proxy enablement." An operating environment for the web proxy is shown in FIG. 3, although the techniques of this disclosure may be implemented with any proxy and not just the commercial system shown there.

Figure 4:
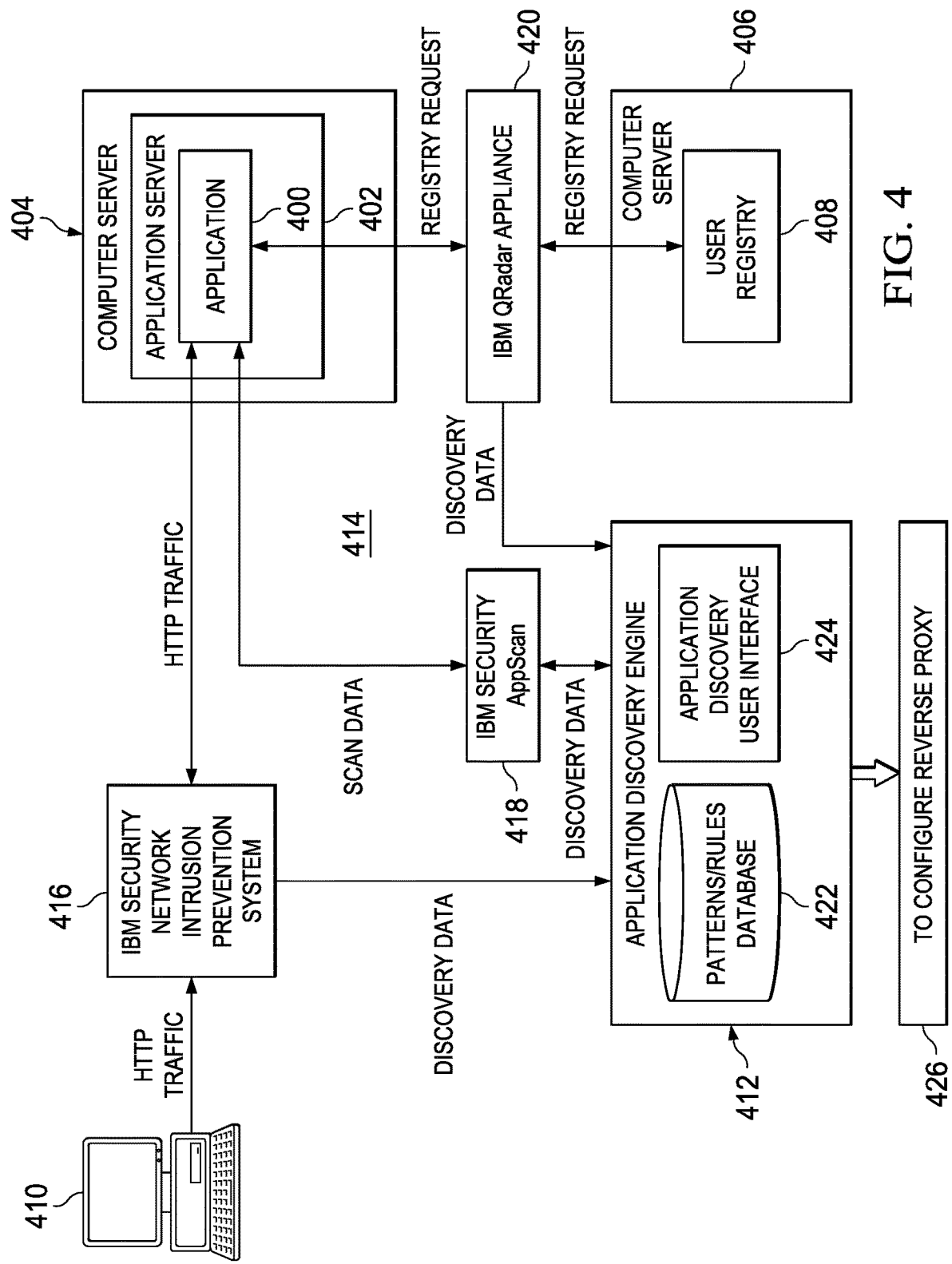
FIG. 4 is a simplified block diagram of a mechanism to perform automated detection of web-based application characteristics for reverse proxy enablement according to this disclosure.

FIG. 4 illustrates a mechanism for carrying out this functionality. In this example scenario, the web-based application 400 whose characteristics are to be determined normally executes on an application server 402, which in turn executes on a computer server 404. At the conclusion of the boarding process, the application 400 typically will end up as a backend application, such as shown in FIG. 3, with the reverse proxy 302 (in that figure) serving a front-end protection function, as has been described above. In this example scenario, it is assumed that application 400 interacts with one or more other computer servers, such as computer server 406 supporting user registry 408, to obtain authentication and authorization-related information for permitted users of the application. End user machines, one of which is shown at 410, make requests (e.g., via HTTP or some other request-response protocol) to the web-based application 400, and receive responses.

According to this disclosure, an application discovery engine 412 executes in or in association with the reverse proxy (or some other mechanism) to coordinate the automated collection and characterization of data associated with the application as end users and other systems interact with the application. In particular, and with further reference to FIG. 4, preferably a set of one or more monitoring processes 414 are used to monitor data going in and out of the application 400. The monitoring processes 414 may be separate processes (or programs, or products), or they may be a unified system process (or program, or product). Typically, the monitoring processes 414 provide several high level functions, including without limitation monitoring of network traffic, code scanning and inspection, and authentication and authorization-related event monitoring. To this end, an example (but non-limiting) embodiment comprises a set of commercial products, such as IBM® Security Network Intrusion Prevention System 416, which provides the network traffic monitoring, IBM® Security AppScan 418, which provides the code inspection functionality, and IBM® QRadar® 420, which gathers log data and provides the event monitoring function. Preferably, these one or more monitoring processes execute in an automated manner, as background processes. They may be dedicated to run with the application discovery engine (as part of the disclosed reverse proxy enablement functionality), or they may already be present in the computing environment (and being used for other purposes). Further details regarding these functions are provided below.

As illustrated in FIG. 4, the processes 414 provide their respective discovery data to the application discovery engine 412. The application discovery engine 412 has associated therewith a pattern and rules database 422, and an application discovery user interface 424. As the monitoring processes discover data, the data is provided to and stored in the patterns and rules database 422. Generally, the "patterns" represent information about how clients or other programs interact with the application that is to be boarded. Thus, some examples of patterns include, without limitation, commonly-used HTTP header information used by the application for security, common port numbers that the application uses, common login events, common URL patterns, common JavaScript patterns, and so forth. Information from these patterns is then used to characterize the application. By way of example only, if the common login events are LDAP logins, then a determination can be made that one application characteristic is that the application uses LDAP as the user registry. If LDAP events are identified and that have a certain set of fields, then a further characteristic is that the LDAP server being used is, say, IBM® Directory Server. As another example, if the URL patterns that are detected look REST-based and JSON content is detected in the HTTP flows, then a determination can be made that another application characteristic is that the application uses a REST-based API. REST API patterns can indicate the use of common public REST APIs, which in turn have known security characteristics like how the API is authenticated and authorized. The application discovery engine 412 performs this characterization, preferably by applying one or more rules (as received and stored in the database) to guide heuristics that determine the one or more application characteristics. The patterns and heuristics are collected and stored in the database, which preferably grows over time as new patterns are discovered. New patterns can be discovered as part of automated discovery process (which may occur periodically or otherwise), or they may be input manually.

Preferably, there are several outputs from the application discovery engine 412 and the data collection/characterization operations described above. One output is provided by the application discovery user interface 424, which preferably provides an on-going "status" of the application characteristic discovery process as it carried out. As will be described below, in one embodiment, this status may be provided as a progress indicator, together with a description of each identified characteristic and its discovered value. The other output provided by the application discovery engine 412 is a set of configuration data 426, which represents the configuration that the reverse proxy should apply with respect to the application. The configuration data 426 is then applied by the proxy to "board" the application. In particular, once the configuration data 426 is provisioned in association with the reverse proxy, and preferably this provisioning occurs in an automated manner, the application 400 is available for protection by the proxy.

The configuration data 426 may be output in the form of a report, which (as described above) is then used to integrate the application into the web reverse proxy (i.e. used to add the configuration needed to "board" the application).

Figure 5:
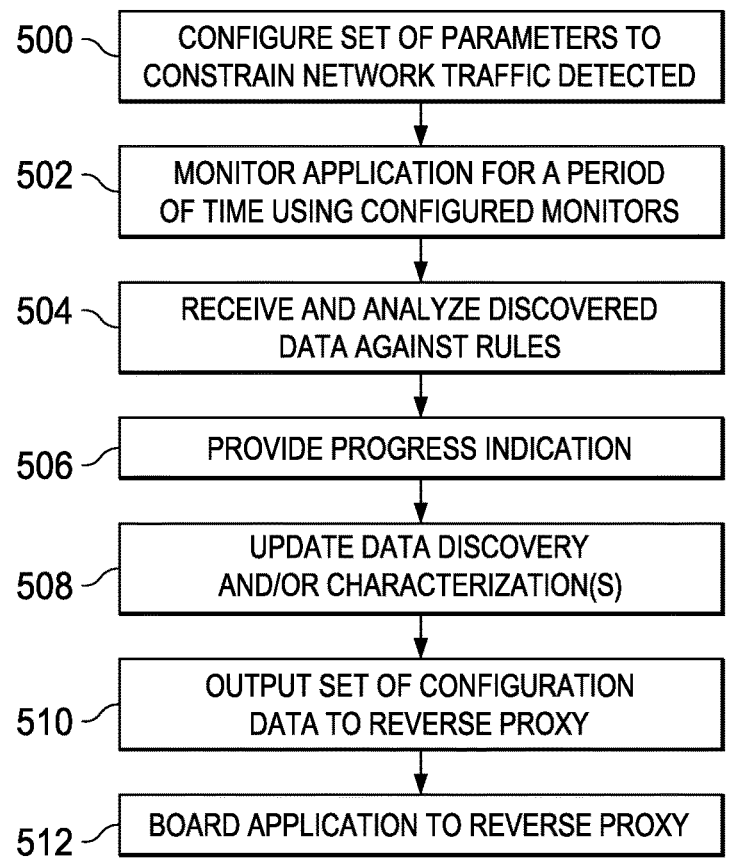
FIG. 5 is a simplified process flow describing an implementation of the auto-detection scheme for reverse proxy enablement according to this disclosure.
Figure 6:
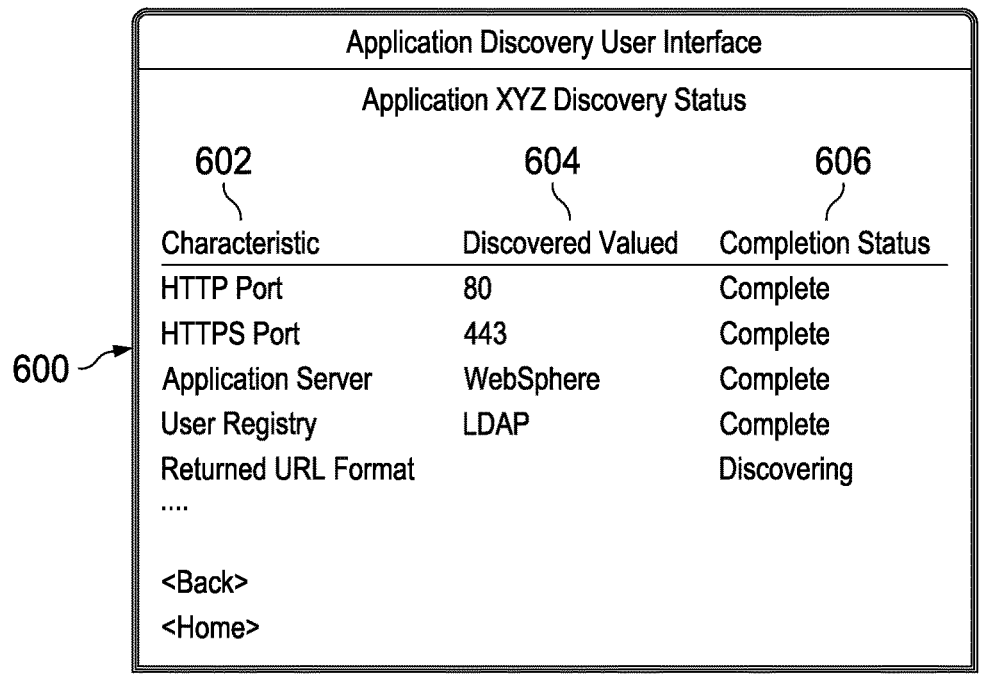
FIG. 6 illustrates a representative graphical user interface (GUI) display showing the operation of a discovery process progress indicator.

Preferably, the above-described application characteristic discovery and on-boarding process is carried for multiple such web-based applications, sequentially or concurrently. To start the process of discovery an application's characteristics, and with reference to the process flow in FIG. 5, preferably a set of a parameters are specified to narrow the scope of network traffic (and other data) to be monitored for the application. This is step 500. These parameters may include, without limitation, IP address or hostname of the machine the application 400 is running on, an application base URL, an application name/type, and other known information about the application. The set of parameters may be specified using a web-based configuration interface (e.g., a set of one or more web pages with appropriate fill-in forms, and the like), or the information may be received by the application discovery engine programmatically. As described above, preferably the application to be boarded is then monitored for a time period, using the various network monitoring and application scanning tools described, until the data required (for the application discovery engine to characterize the one or more application characteristics) is obtained. This is step 502. At step 504, the application discovery engine analyzes the discovered data against the patterns and rules to determine one or more application characteristics. As the application discovery engine is operating and, in particular, as it is analyzing the discovered data against the patterns and rules in the database, the application discovery UI preferably provides a progress indication. This is step 506. In one example embodiment, which is shown in FIG. 6, a graphical user interface 600 displays three columns, the application characteristic identified 602, the value of the discovered/determined characteristic 604, and the completion status 606 for the particular characteristic. Other data, and other display formats, may be provided. Thus, the interface preferably shows which data is still being gathered, and which characteristics may not have any data discovered yet. The interface provides a convenient way for a user to determine the extent to which the discovery and characterization process is on-going, nearing completion, or completed. Referring now to back to FIG. 5, as additional pattern data is discovered, or as new rules are added to the database, the application discovery status (as shown in the display) may be continually updated. This is step 508. Thus, the monitoring and characterization processes of this disclosure may be executed continuously over a time period, or re-executed periodically to enable the reverse proxy to be enabled for the most current or up-to-date characteristics of the application that it is protecting. At the end of the monitoring, or at some intermediate time as determined by the system (or an operator), the application discovery engine outputs the set of configuration data (or the report detailing such data). This is step 510. At step 512, the set of configuration data is associated with the reverse proxy to board the application.

Preferably, steps 502, 504, 508 (optionally), 510 and 512 are carried in an automated manner, synchronously or asynchronously, periodically or otherwise. As noted above, these steps preferably are carried out for one or more applications that are to be boarded in association with the proxy.

The application discovery engine may be implemented as software, e.g., one or more computer programs, executing in hardware processing elements. As described above, preferably the application discovery engine uses heuristics (and heuristic analysis) to facilitate the determination of the application characteristics. Other deterministic or probabilistic analysis methods also may be used, or may be used to supplement the heuristic analysis. Although not shown in FIG. 4, the application discovery engine may be controlled or managed from a separate management interface running on a computing machine in or in association with the environment.

As illustrated in FIG. 4, various products and product technologies can be used to discover the required data. The identification of these various products and technologies is not intended to be limiting. As noted, these technologies can be embedded in a single process or mechanism, or they can be used independently to discover the data that is then used by the described mechanism to determine the application characteristics.

The above-described technique provides the information needed to board an application into a reverse proxy. The following provides additional details regarding some of the information (the "discovery data" as shown in FIG. 4) used to determine characteristics needed to integrate the application into the web reverse proxy environment. This information includes, without limitation: how are users authenticated to the application; how many users typically use the application in a specified time period; what user registry is the application using; what format URLs (relative vs. absolute) get passed back and forth in the application; what type of technology is used inside the application (e.g., AJAX or extensive use of HTTP-based REST interfaces); is there a large amount of embedded JavaScript being sent to the client or back to the server; which port numbers are being used by the application; what HTTP header information is included in the requests to the application; what cookies are included in the HTTP requests; what token types are being used; what domains are being used; what application server environment is the application hosted on; are there any federation requirements to authenticate to third party application; which junctions should be grouped together, and many more.

As described, the application discovery engine uses patterns and heuristics to determine application characteristics.

The patterns and heuristics are collected into the application characteristic pattern database. Some non-limiting examples of patterns are: sample LDAP login events to determine if LDAP is the user registry, and which LDAP server is being used; other login events to non-LDAP registries; REST API URL patterns to help find REST API usage; JavaScript patterns to help find embedded JavaScript usage; commonly-used HTTP header information used for security; common port numbers that go with certain types of applications, and so forth. Thus, for example, when heuristics and rules are based on header content, inclusion of specific header values may indicate which security protocol is being used (e.g., SAML, OAuth, or the like), or which specific application server (or other) products are being used, as products often use header values in particular ways. In a similar manner, and when heuristics and rules are based on content type (such as HTML, or JSON), specific patterns also may indicate use of certain application servers.

As noted, new patterns can be part of a new discovery, or can be input manually. Preferably, the database contains one or more rules that can be specified to guide heuristics. Some non-limiting examples of rules include the following: if LDAP events have a certain set of fields, then the LDAP server is IBM Directory Server; if a URL pattern looks like a REST API pattern and there is also JSON content in the HTTP flows, then the application uses REST APIs, and so forth. As noted above, REST API patterns can indicate use of common public REST APIS, which have known security characteristics.

Of course, the examples described above are merely intended for illustrative purposes and should not be taken by way of limitation.

As has been described, FIG. 4 illustrates one possible implementation involving a set of identified commercial products. Details of these products are now provided, solely for illustrative purposes and not by way of limitation. Thus, e.g., using the IBM QRadar appliance, events are collected from the application and qflows are analyzed to and from the system(s) where the application is running. This data is then correlated with collected QRadar asset data to determine various types of information. In particular, user login events are filtered and counted over a set time period to determine how many users a day authenticate to the application. Userids in user login events are filtered and counted to determine how many different users authenticate to a system or application over a set time period. Net flows from the application or system(s) hosting the application are analyzed and compared against QRadar assets characterized as user registries to determine which user registries an application is using. As is known, the QRadar product performs Layer 7 analysis of network traffic. QRadar qflow data, including payload data that is part of the Netflow events, along with collected vulnerability data, is analyzed to determine additional information. This information is also of several types: what ports are open on systems hosting an application, and what ports are being used by application traffic; what content of the HTTP traffic to look for URL references to determine if they are relative vs absolute; HTTP headers and their values, as well as what cookies are included in the requests. URLs can be analyzed to determine if they match common URL REST patterns (this would include the detection of JSON content; e.g., if a pattern matches, then usage of REST APIs is an application characteristic); Netflow event payload can be compared against JavaScript patterns to determine JavaScript usage.

Using IBM Security Network Intrusion Prevention System, much of the same information can be gathered from the network traffic flowing through one of these devices. One advantage of using the Network Intrusion Prevention product is that SSL connections can be terminated so that encrypted data can be analyzed. Using both products, a more complete set of data can be examined, and the description of the discovered application characteristic can be more complete. An example of a characteristic that can be determined is which token types are being used by this application.

IBM Security AppScan can scan the application and provide various reports, once again to facilitate discovery of the relevant application characteristics. For example, data from one or more of the following AppScan reports can be used: the authentication Points report, which shows authentication points in the application and can be used to help identify how users are authenticated; the hosts report, which shows web topology of web applications including domain names and operating systems hosting application; the HTTPS servers cipher suites details report, which shows protocol, cipher suite and port information for application web servers; the third-party links report, which provides an inventory of third party links that can indicate federation requirements and relative vs. absolute URL information; the web applications report, which provides an inventory of server-side and client-side applications including technologies used to build the application; the web servers report, which categorizes web servers by role (e.g. HTTP, HTTP application) and type and that can also indicate what web platform the application is built-on; the website architecture report, which provides inventory of unique internal domains found; the web site technologies report, which provides an overview of technologies found across a website (e.g. HTML, JavaScript, PHP, TCL, Perl, etc.). Although not meant to be limiting, the application discovery engine may be implemented in association with IBM WebSphere® ILOG JRules, which can provide the rules engine with the pattern and rule data. The data itself may be stored in a cloud-based database so that the patterns and rules can be accessed and added to in multiple locations.

As noted above, the identification of these commercial products is provided solely for illustrating an embodiment, but they should not be taken to limit the subject matter to any particular products or services.

The described technique provides significant advantages. A primary advantage is the providing of a mechanism that enables enterprises to on-board their web-based business applications to a reverse proxy operating environment in a seamless, automated and scalable manner. The monitoring and characterization processes describe ensure that applications are on-boarded with a minimum of effort, and irrespective of differences between or among the applications. With this approach, security professionals and business application owners no longer have to manually gather and discover the characteristics of each of the applications or otherwise require dedicated web proxy experts to ensure a successful integration of the application.

The application discovery engine, in whole or in part, may be delivered "as-as-service" (SaaS). In an alternative embodiment, the application discovery engine may be implemented in association with an open-domain Q&A system that uses a natural language processing (NLP) artificial intelligence (AI)-based learning machine. A machine of this type may combine natural language processing, machine learning, and hypothesis generation and evaluation; it receives queries and provides direct, confidence-based responses to those queries. A Q&A solution such as IBM Watson may be used for this purpose.

The functionality described above may be implemented as a standalone approach, e.g., a software-based function executed by a processor, or portions of it (such as the cookie generation, cookie jar checking, or sign-off request processing) may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The proxy may be located in a domain that differs from the domain of one or more back-end applications and, thus, the techniques herein may be practiced in a loosely-coupled server (including a "cloud"-based) environment. The proxy itself may be hosted in the cloud, in which case it can provide single sign-on to applications running in a third party environment as well as the single sign-off functionality described herein.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the managed cookie functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the monitoring and application discovery engine components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises an automated detection framework that provides determination of web-based application characteristics for reverse proxy enablement, as has been described above.

The automated detection and application characteristic determination function(s) may be implemented as an adjunct or extension to an existing access manager (e.g., IBM WebSEAL) or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to onboard applications to a Web-based portal having a point of contact that provides authentication, session management and authorization, but this will be a typical implementation.

As noted, the above-described application on-boarding function may be used in any system, device, portal, site, or the like.

Having described our invention, what we now claim is as follows.

The invention claimed is:

1. A method for automated on-boarding of a web application in association with a proxy that provides authentication and authorization functions on behalf of web applications that are coupled to the proxy, comprising:
monitoring communications to and from the web application as a first set of users interact with the web application to discover data indicative of one or more application characteristics;
analyzing the data against one or more rules to identify the one or more application characteristics;
based on the one or more identified application characteristics determined by monitoring communications to and from the web application as the first set of users interact with the web application, generating a set of configuration data to be used to configure the web application to the proxy so that the proxy can thereafter provide the authentication and authorization functions on behalf of the web application; and
applying the configuration data to the proxy to thereby on-board the web application so that the proxy thereafter provides authentication and authorization functions on behalf of the web application;
wherein at least the monitoring and analyzing operations are carried out in software executing in one or more hardware processing elements.

2. The method as described in claim 1 wherein the data include one or more application characteristic patterns, and wherein the analyzing step compares the one or more application characteristic patterns to one or more heuristic rules.

3. The method as described in claim 1 further including scanning the web-based application to identify at least one application characteristic.

4. The method as described in claim 1 further including providing a progress indication as the data is discovered and the one or more application characteristics are being identified.

5. The method as described in claim 4 wherein the progress indication is rendered visually.

6. The method as described in claim 1 further including receiving a set of one or more parameters to configure the monitoring operation.

7. The method as described in claim 1 wherein the proxy is a reverse proxy enabled as a Web portal.

8. Apparatus, comprising:
a processor;
non-transitory computer memory holding computer program instructions executed by the processor for automated on-boarding of a web application in association with a proxy that provides authentication and authorization functions on behalf of web applications that are coupled to the proxy, the computer program instructions comprising:
program code to monitor communications to and from the web application as a first set of users interact with the web application to discover data indicative of one or more application characteristics;
program code to analyze the data against one or more rules to identify the one or more application characteristics;
program code using the one or more identified application characteristics determined by monitoring communications to and from the web application as the first set of users interact with the web application to generate a set of configuration data to be used to configure the web application to the proxy so that the proxy can thereafter provide the authentication and authorization functions on behalf of the web application; and
program code to apply the configuration data to the proxy to thereby on-board the web application so that the proxy thereafter provides authentication and authorization functions on behalf of the web application.

9. The apparatus as described in claim 8 wherein the data include one or more application characteristic patterns, and wherein the program code to analyze compares the one or more application characteristic patterns to one or more heuristic rules.

10. The apparatus as described in claim 8 wherein the computer program instructions also include program code operative to scan the web-based application to identify at least one application characteristic.

11. The apparatus as described in claim 8 wherein the computer program instructions also include program code to provide a progress indication as the data is discovered and the one or more application characteristics are being identified.

12. The apparatus as described in claim 11 wherein the progress indication is rendered visually.

13. The apparatus as described in claim 8 wherein the computer program instructions further include program code to receive a set of one or more parameters to configure monitoring of the communications.

14. The apparatus as described in claim 8 wherein the proxy is a reverse proxy enabled as a Web portal.

15. A computer program product in a non-transitory computer readable storage medium for use in a data processing system, the computer program product holding computer program instructions which, when executed by the data processing system, perform automated on-boarding of a web application in association with a proxy that provides authentication and authorization functions on behalf of web applications that are coupled to the proxy, the computer program instructions comprising:
program code to monitor communications to and from the web application as a first set of users interact with the web application to discover data indicative of one or more application characteristics;
program code to analyze the data against one or more rules to identify the one or more application characteristics;
program code using the one or more identified application characteristics determined by monitoring communications to and from the web application as the first set of users interact with the web application to generate a set of configuration data to be used to configure the web application to the proxy so that the proxy can thereafter provide the authentication and authorization functions on behalf of the web application; and
program code to apply the configuration data to the proxy to thereby on-board the web application so that the proxy thereafter provides authentication and authorization functions on behalf of the web application.

16. The computer program product as described in claim 15 wherein the data include one or more application characteristic patterns, and wherein the program code to analyze compares the one or more application characteristic patterns to one or more heuristic rules.

17. The computer program product as described in claim 15 wherein the computer program instructions also include program code operative to scan the web-based application to identify at least one application characteristic.

18. The computer program product as described in claim 15 wherein the computer program instructions also include program code to provide a progress indication as the data is discovered and the one or more application characteristics are being identified.

19. The computer program product as described in claim 18 wherein the progress indication is rendered visually.

20. The computer program product as described in claim 15 wherein the computer program instructions further include program code to receive a set of one or more parameters to configure monitoring of the communications.

* * * * *